United States Patent

[11] 3,589,733

[72] Inventor Tadeus Piotrowski
Vienna, Australia
[21] Appl. No. 733,176
[22] Filed May 29, 1968
[45] Patented June 29, 1971
[73] Assignee U.S. Philips Corporation
New York, N.Y.
[32] Priority June 16, 1967
[33] Australia
[31] 5603

[54] APPARATUS FOR CHANGING AND PLAYING BACK RECORDER TAPE MAGAZINES

27 Claims, 8 Drawing Figs.

[52] U.S. Cl. ........ 274/4, 242/181, 242/198
[51] Int. Cl. ........ B65h 19/04, G11b 5/00, G11b 23/08
[50] Field of Search ........ 242/198, 199, 200, 180, 181, 197; 274/4, 11; 179/100.22

[56] References Cited

UNITED STATES PATENTS

| | | | |
|---|---|---|---|
| 3,385,534 | 5/1968 | Staar .......... | 242/198 |
| 3,475,031 | 10/1969 | Kuehnlein .......... | 274/4 (C) |

*Primary Examiner*—George F. Mautz
*Attorney*—Frank R. Trifari

ABSTRACT: An apparatus for playing back and for changing tape recorder magazines in a recorder/playback device, each magazine having two winding cores and at least one aperture across which a tape extends from one winding core to the other so that the tape will be exposed at the aperture. Magazines may be stacked loosely one on top of the other in a storage space mounted on the apparatus, the lowermost magazine being in an operative playback position. Playback mechanisms for engaging the magazine in the playback position carry a scanning member or magnetic head for insertion into the magazine and engagement with the tape, and mandrels for engagement with each of the winding cores of the magazine are carried on a pivotally mounted frame. The playback mechanisms are moved into an operative position when a magazine has been fed from the stack to the playback position. A transport mechanism operates to remove the lowermost magazine in the stack from the playback position through a slot in the storage rack after the tape on the magazine has been completely played. The playback mechanisms and the transport mechanism are actuated by a control disc which has a plurality of cam tracks for operating the various elements of the playback mechanism and the transport mechanism. At the completion of the tape-playing operation, the disc will be rotated so that the scanning member will be first pulled out of engagement with the tape, the full will be lowered so that the mandrels are out of engagement with the winding cores and the transport mechanism will be operated so that the magazine in the playback position will be ejected from the stack. One complete revolution of the control disc will result in ejection of one magazine and commencement of the playback operation for the next magazine.

INVENTOR.
TADEUS PIOTROWSKI
BY
Frank R. [signature]
AGENT

INVENTOR.
TADEUS PIOTROWSKI

BY

AGENT

INVENTOR.
TADEUS PIOTROWSKI
BY
Frank R. [signature]
AGENT

INVENTOR.
TADEUS PIOTROWSKI
BY
Frank R. Trifari
AGENT

INVENTOR.
TADEUS PIOTROWSKI
BY
AGENT

APPARATUS FOR CHANGING AND PLAYING BACK RECORDER TAPE MAGAZINES

This invention relates to apparatus for changing and playing back a plurality of recorder tape magazines each having two winding cores which can be slipped onto winding mandrels of the apparatus and having at least one aperture behind which a tape extends from winding core to winding core. The playback device may successively be brought into playing connection with the individual magazines being placed in playback position. The playback device is provided with a support, movably arranged on the apparatus, for introducing tape-scanning members fitted on said support into the aperture of a magazine. The playback device is further provided with winding mandrels, at least one of which can be driven by an electric motor, and with a transport mechanism for removing a magazine from the playback position along a given path, a rotary control disc for controlling the movement for the magazine changing is also provided which swings the support away from the aperture of a magazine and which sets the transport mechanism into motion. Devices for housing a plurality of magazines in a holder and, displacing the entire holder relative to the tape-scanning members by means of a transport mechanism, for selecting a magazine for playback thus obtaining the playback position of the desired magazine are known. The winding mandrels are fitted on guide tubes which extend into the winding cores of the magazines. By sliding the holder along the tubes, only that recorder tape, which is present in the magazine to be played, is driven. A control disc controls the operations necessary for magazine changing.

An object of the invention is to provide a very simple and efficacious construction for an apparatus of the kind described above and in which the winding mandrels are fitted on a frame movably arranged on the apparatus, said frame being movable by means of the control disc, from a first position in which the winding mandrels are in operative connection with the winding cores of a magazine to be played back, to a second position in which this operative connection is eliminated, and that after the transfer of the frame to the second position, the transport mechanism removes a magazine from the playback position in a direction perpendicular to the winding mandrels.

It has been found advantageous if the motor with the driving device for at least one winding mandrel is also fitted on the frame which carries the winding mandrels, so that the entire driving device for the winding mandrels is simplified. In apparatus for magazines each having an aperture to allow entry of a driving shaft coacting with the tape and extending in parallel relationship with the winding mandrels it is further preferable if the driving shaft, possibly together with a flywheel connected thereto, is also fitted on the frame and driven by the same electric motor. A very simple device for displacing the frame is obtained by providing the frame with a mounting plate pivoted in the apparatus and having, for the displacement thereof, a lateral extension, for example, a roller or the like, which engages a cam track provided on the control disc. To permit other parts of the apparatus, such as, for example, the control disc, to be driven by the same motor in a simple manner the pivot shaft of the mounting plate is arranged to extend at right angles to the motor shaft at only a small distance therefrom and preferably intersecting it, so that the motor itself performs only a small pivotal motion.

It has further been found to be of advantage to provide a locking member in the given path for removing a magazine from the playback position. The locking member is controlled by the control disc and is pulled out of the path only during the operation of the transport mechanism for removing a magazine from the playback position. By this means inadvertent displacement of a magazine in the playback position is avoided. To reach a defined playback position of a magazine it has further been found advantageous that a thrust lever moved by the control disc be present, a free end of which lever pushes the magazine to be played back into a defined position, before the playback device has been brought into playing connection with it. In an apparatus having a counter which can be reset to zero, it becomes much simpler to find a certain area on the recorder tape due to the presence of a device for resetting the counter which is actuated by the control disc during the magazine changing.

In a preferred embodiment the apparatus is provided with a chutelike storage space for stacking magazines loosely on one another and with a lateral exit aperture for the lowest magazine, the transport mechanism comprising a slide which is guided in the base of the chutelike storage space and which is movable, by means of the control disc, in the direction of transport of a magazine transversely over the whole aperture of the chute, the slide being provided with an arm as a gripping member which extends in the longitudinal direction of the chute and can be tilted against the action of a spring only in the direction of transport of a magazine at right angles to the longitudinal direction of the chute. In fact, this results, in addition to a very simple transport mechanism, in easy operation of the apparatus. Furthermore, it has been found advantageous if, for moving the slide against the action of the spring, a rope is connected thereto at one end and connected at its other end to a pin which is arranged near the periphery of the control disc, which performs one revolution for a magazine change, said pin projecting from the said disc on a side free from structural parts. In another preferred embodiment a holder for receiving the played magazines, which preferably has the same volume as the storage space, is arranged in the given path for removing a magazine from the playback position at the side of the chutelike storage space. A device for stopping and switching off the playback apparatus is provided and is operated by a feeler which extends into the holder and is displaceable when the holder is completely filled with magazines.

In a preferred design of the drive for the control disc, the control disc has a peripheral gear which meshes with a gearwheel. The gearwheel is fitted on a lever which is pivotable against the action of the spring and adapted to be continuously driven by the electric motor of the apparatus. The lever has connected to it a locking member, which engages the gear of the control disc with the gearwheel swung away therefrom, said lever further having connected to it a displacing device which determines the beginning and the end of the movement of the control disc. In a further preferred embodiment a cam disc coacting with the lever is arranged as a displacing device on the control disc, a locking device being provided for holding the lever with the gearwheel lifted off the gearing of the control disc. The locking device is pivotable by means of an electromagnet and/or a mechanical operating member for releasing the lever, the circuit of the electromagnet including: an "on" switch of the apparatus, a switch which is operated by a feeler sensing the presence of a magazine in the playback position, a switch which is operated if the tape of a magazine is completely played back and a switch which can be operated by the cam disc after a complete changing cycle and with which an "off" switch is connected in series. To permit the control disc to be rapidly stopped, the design is preferably chosen to be such that the cam disc is rotatably arranged on the control disc and is pulled by a spring against an abutment on the control disc, the cam disc being provided with as many holding lugs as cams are present, for the holding of said lugs a locking means being provided which can be moved outside the reach of the holding lugs for the release thereof by means of releasing cams provided on the control disc in conformity with the holding lugs. It has been found to be of advantage to provide the cam disc with two cams coacting with the lever. One of the cam discs (the first with respect to its direction of rotation) pivots the lever away from the control disc after the transport mechanism has just removed a magazine from the playback position and the other cam disc pivots the lever away after the playback device has been brought into playing connection with a magazine. Another advantageous embodiment of a displacing device so as to accomplish this purpose is to provide an electromagnet acting directly on the lever. The current circuit of the magnet includes: the "on" switch of the apparatus for starting the movement of the control disc; a switch which is operated if the tape of a magazine is completely played back, and a contact of a holding relay for the electromagnet, as well as a switch for stopping the movement of the control disc which is present in the circuit of the holding relay and controlled by a feeler sensing the presence of a magazine in the playback position, and another switch which is operated for a short period by the control disc.

In order that the invention may be readily carried into effect several embodiments thereof will now be described in detail, by way of example, with reference to the accompanying diagrammatic drawings, in which.

Figure 1:
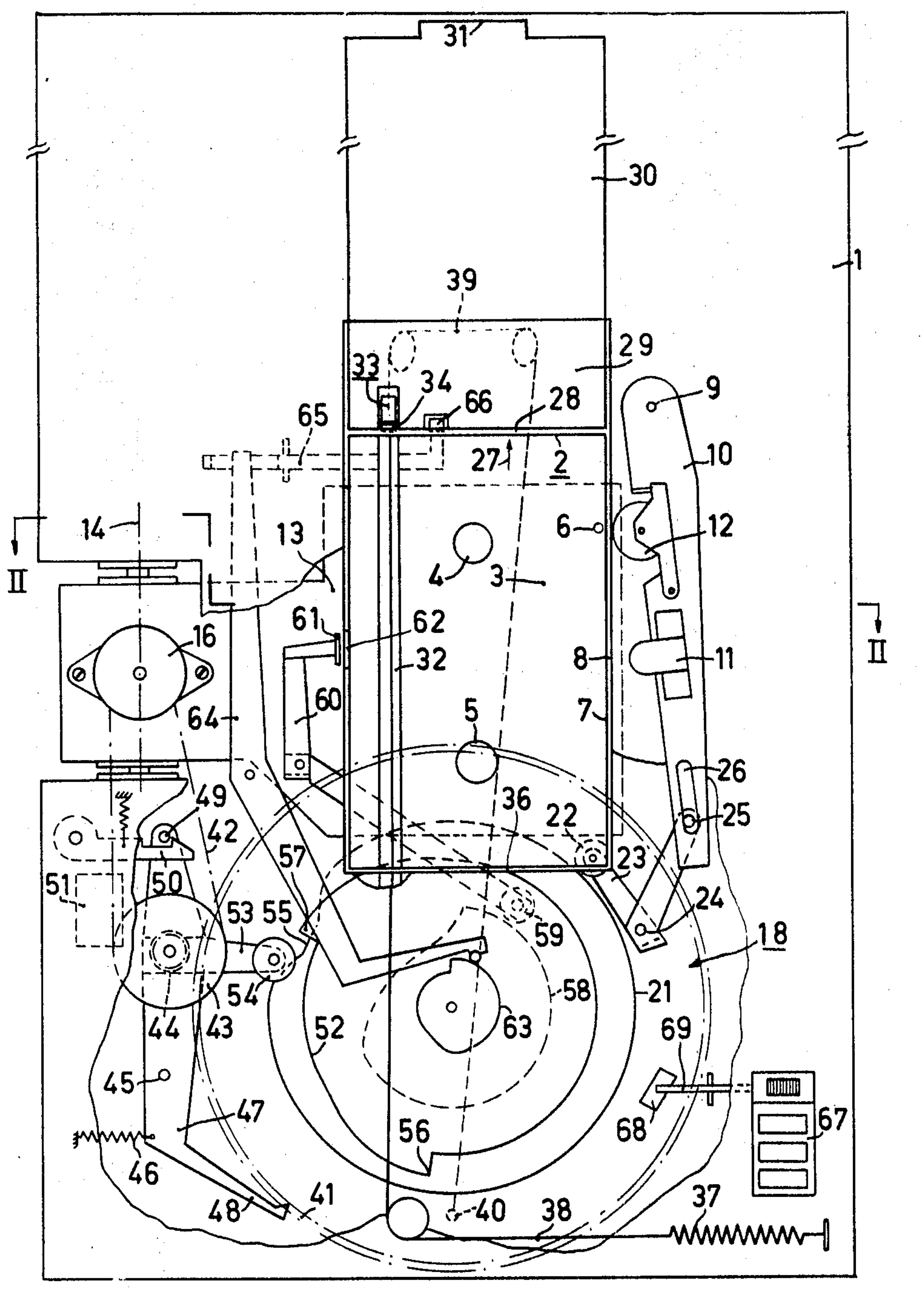
FIG. 1 is a plan view and FIG. 2 is a sectional view, taken on the line II–II of FIG. 1, of a first embodiment having a chutelike storage space for the magazines.
Figure 2:
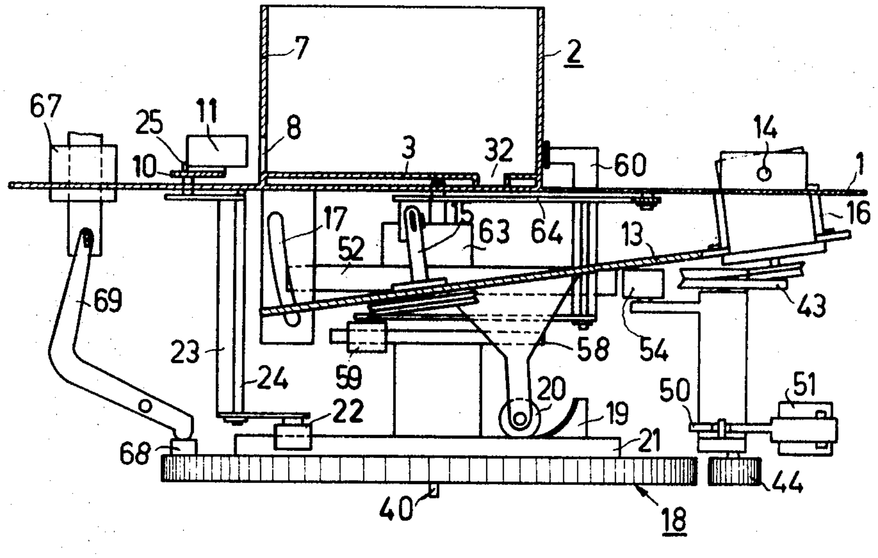

In FIGS. 1 and 2 the reference numeral 1 indicates the chassis of an apparatus, parts of which have been omitted to show the essential details of the invention more distinctly. The chassis 1 is provided with a chutelike storage space 2 in which a plurality of magazines can be stacked loose on one another, the lowest magazine lying on the base 3 of the storage space and occupying the playback position. However, FIGS. 1 and 2 show the apparatus without its magazines. The base 3 has two apertures 4, 5 and a third aperture 6. The apertures 4 and 5 serve to allow the passage of winding mandrels which coact with the winding cores incorporated in the magazine. A driving shaft extends through the aperture 6. A wall 7 of the storage space has an aperture 8 within the reach of the lowest magazine through which aperture tape-scanning members, such as one or a plurality of magnetic heads 11 fitted on a support 10 pivoted to a shaft 9 on the chassis, and a pressure roller 12 coacting with the driving shaft can be moved towards a magazine which is in the playback position, thereby passing through a corresponding aperture in the magazine and coacting with a record carrier, hereinafter briefly referred to as "-tape," which extends from winding core to winding core.

A frame 13 in the form of a mounting plate, which can pivot about a fixed shaft 14 of the apparatus, is arranged beneath the base 3. A slot 17 in which an extension of the frame can slide serves to guide the pivotal movement. The frame 13 carries winding mandrels 15, an electric motor 16 and a driving shaft, together with a flywheel, the two last-mentioned parts not being shown. The drive for the winding mandrel or mandrels and the driving shaft by means of the electric motor 16 are also not shown for the sake of simplicity; this may take place, as is common practice, for example, through ropes or friction wheels. The frame 13 is displaced by means of a control disc 18 rotatably supported on the chassis 1 of the apparatus and for this purpose having a cam track 19 on which the frame 13 bears by a roller 20 which is rotatably supported on an arm thereof. In the position of the frame 13 as shown in FIG. 2 the winding mandrels 15 lie beneath the chassis 1 so that there is no operative connection with the winding cores of any magazine present in the chute 2. However, when the frame 13 is lifted, the winding mandrels pass through the apertures 4 and 5, as does the driving shaft through the aperture 6, thus coming into operative connection with the magazine to be played back.

The support 10 is likewise displaced by means of control disc 18, which for this purpose has a second cam track 21 along which a roller 22 slides which is rotatably supported on a lever 23 which in turn is pivoted to a shaft 24 and extends by a pin 25 into a slot 26 in the support 10.

Figure 3:
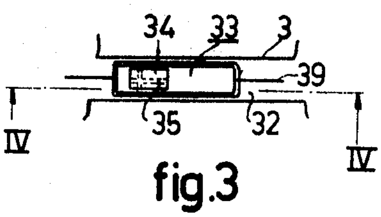
FIG. 3 is a plan view and FIG. 4 is a sectional view, taken on the line IV–IV of FIG. 3, of a detail of the transport mechanism, the gripping member, of the embodiments of FIGS. 1 and 2.
Figure 4:
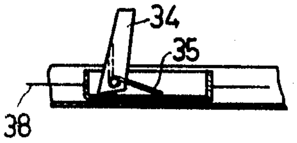

To remove a magazine from the playback position, which is effected in the direction indicated by arrow 27 (FIG. 1), a wall 28 of the storage space 2 is provided with an aperture through which the lowest magazine can pass. This direction is at right angles to the winding mandrels 15, the path of movement of the magazine being formed by the base of the storage space which merges outside the aperture in the wall 28 into an inclined surface 29 along which a magazine which has been played back slides into a holder 30. A wider portion 31 of the holder serves to permit magazines present therein to be readily removed therefrom by hand. To remove a magazine from the playback position there is provided a transport mechanism having a slide 33 which is guided in a recess 32 formed in the base 3 of storage space 2. The slide 33 is shown in detail in FIGS. 3 and 4. The slide 33 is provided with a gripping member 34 in the form of an arm on which a spring 35 engages in such manner that it can be tilted over only in the direction of movement 27 of a magazine at right angles to the longitudinal direction of the chute. The recess 32 extends transversely throughout the aperture of the chute and also beyond it on either side so that the slide can be moved from one narrow side 36 of the chute to the other 28, thereby each time passing wholly out of the chute. If the slide is outside the chute at the narrow side 36 thereof, the arm 34 is always directed upwards. However, when moved in the direction indicated by arrow 27, the arm grips a magazine present on the base of the chute and conveys it into the holder 30. When the slide moves backwards and a new magazine has assumed the playback position, the arm is tilted over by it so that the slide under this magazine can be moved back again to its starting position. A set of ropes 38 and 39 provide for the movement of the slide. One end of the slide 33 is secured to the rope 38, which is subject to the action of a spring 37, and its other end is secured to the rope 39 (FIG. 1). The rope 39, which is guided over rollers, is secured at its other end to a pin 40 on the control disc 18, which projects therefrom on a side free from structural parts. The slide is thus also displaced as a function of the position of control disc 18.

This embodiment is such that the control disc performs a complete revolution for a complete changing cycle, that is to say, during one revolution of the control disc, one magazine will be ejected and the playback device will be brought into playing connection with another magazine. For driving the control disc it is provided with a peripheral gearing 41 which may be engaged by a gearwheel 44 which is continuously driven by the electric motor 16 through a rope 42 and an intermediate wheel 43, the control disc being rotated in the clockwise direction. This simple drive of the gearwheel 44 by the electric motor 16 is possible, because the motor will be caused to tilt only by a small amount upon the swinging movement of the frame. The gearwheel 44 is seated on a lever 47 pivoted to a shaft 45, which lever is subject to the action of a spring 46 and carries a locking member 48 which blocks the control disc when the gearwheel 44 has been swung away therefrom. The lever 47 also has a pin 49 which can snap into a locking member 50 displaceable by an electromagnet 51 and/or a mechanical operating member, so that the gearwheel can be held out of engagement with the control disc. The displacement of the lever 47 for disengaging the gearwheel is effected from the control disc which for this purpose has a third cam track 52 which coacts with a roller 54 arranged on an arm 53 of the lever 47, as soon as the lever 47 is clear of the locking member 50.

As previously mentioned, the apparatus is shown in a position in which the storage space does not hold a magazine and the transport mechanism has removed the final magazine from the playback position, the slide 33 finding itself outside the chute 2 in its extreme position near the holder 30. If one or more magazines have to be played back they are placed on one another in the storage space and, subsequently, the apparatus is switched on with the result, as will be described hereinafter, that the locking member 50 releases the lever 47. The gearwheel 44 now drives the control disc. Due to the rotation of the control disc, at first the frame 13 is lifted through the cam track 19 and hence the winding mandrels 15 and the driving shaft are introduced into the magazine which is in the playback position. During the operation, a depression 55 provided in the cam track 21 also reaches the roller 22 so that the support 10 with its scanning members 11 is pivoted towards the magazine. As soon as this operation is terminated the roller 54 is swung aside by the first cam 56 on the cam track 52 and makes the lever 47 snap into the locking member 50 so that the control disc is no longer driven and held in its final position by the locking member 48. During this operation, the slide 33 has been partly pulled beneath the magazine which is in the playback position, but this remains without consequences due to the arm 34 being tilted over. However, the process of playing back the magazine is thus initiated and is retained until the magazine has been completely played back or this process is terminated purposely.

At the end of a playback process the locking member 50 is again displaced as will be described hereinafter, thus releasing the lever 47 so that the control disc is driven again through the gearwheel 44. Upon this rotation of the control disc, the roller 22 is the first to be displaced by the cam track 21 due to the depression 55 coming outside the reach of the roller 22, and as a result the support 10 is again swung out of the aperture 8 of the chute, whereby the scanning members 11 and the pressure roller 12 are also removed from the magazine just played back. Following this operation the roller 20 again leaves the elevated portion of the cam track 19 so that the frame 13 is again swung away from the base 3 of the chute, whereby the winding members 15 and the driving shaft come outside the reach of the magazine just played back. The drive of the tape in the magazine is thus interrupted. During these operations the pin 40 has also moved on so far that the rope 38, 39 has performed its maximum stroke with the result that the slide is now outside the chute on the side 36 thereof. During this operation the arm 34 has also been erected. Since the control disc is still rotated further, the pin 40 tensions again the rope 39 whereby the slide is moved in the direction indicated by arrow 27. This is the beginning of the removal of the magazine from its playback position due to the gripping member 34 sliding the magazine through the aperture in the wall 29 to the exterior and into the holder 30. As soon as the slide 33 has left the aperture in the wall 28 the roller 54 is displaced by the second cam 57 present on the cam track 52, so that the drive for the control disc is again interrupted and the lever 47 is held by the locking member 50. The original condition is thus restored. The control disc has performed a complete revolution. If the storage space contains still more magazines, the next assumes the playback position and the whole cycle is repeated.

The control disc preferably has a fourth cam track 58 with which a roller 59 coacts which is arranged on a pivot lever 60 the free end 61 of which lies, in the position shown in FIG. 1, in front of an aperture 62 in the chutelike storage space and within the reach of the lowest magazine. When the lever is pivoted its end 61 enters the storage space and pushes the lowest magazine into a predetermined position. This lever thus acts as a thrust lever. The cam track 58 controls the movement of the lever in such manner that the magazine is urged into the playback position before the playback device is in play connection therewith, that is to say before the frame 13 has swung upwards and the support 10 has swung towards it. The magazine is not released until the play connection with the playback device has been eliminated. This always ensures a predetermined position of the magazine to be played back and the play connection with the playback device can always be made with accuracy.

It is preferable to provide the control disc with another cam track 63 with which a pivot lever 64 coacts which in turn displaces a pivot lever 65 which is in the form of a locking member. The free end 66 thereof extends into the path for removing a magazine from the playback position and is controlled by the cam track 63 and pulled out of the path only during the movement of slide 33 in the direction indicated by arrow 27. This ensures that a magazine cannot arbitrarily be removed from the playback position.

The apparatus also includes a counter 67 which can be reset to zero in the usual manner. This resetting may be effected manually, but takes place automatically in the embodiment shown by means of the control disc 18 which operates through a switching cam 68 a switching lever 69 during each change of a magazine. The counter thus starts counting from zero for each magazine to be played back.

A very advantageous control device for the apparatus will now be described with reference to FIG. 5. First of all, however, reference is made to a particular design of the control disc 18. To ensure accurate operation of the apparatus it is important that the cams 56 and 57 should displace the lever 47 as rapidly as possible, in order that the control disc stops soon. This is achieved in the present example due to the cam track 52 being provided on a separate disc 70 which can rotate about the axis of the control disc, whereby the cam disc 70 is pulled, by means of a spring 71, against a stop 72 which extends into a recess 73 of the cam disc. Consequently the control disc and the cam disc are coupled together. Furthermore the cam disc is provided with as many holding lugs 74 and 75 as cams are present. A locking member 76 is provided for arresting the holding lugs. To release the locking member 76, releasing cams 77 and 78 are provided on the control disc in conformity with the holding lugs.

During rotation of the control disc, the cam disc is held by the locking member 76 before a cam 56 or 57 on the cam disc 70 displaces the roller 54, whereby the spring 71 is tensioned. As soon as the control disc has reached the correct instant of switching, it displaces the locking member 76 by means of the releasing cams 77 and 78, thus releasing the cam disc. However, the tensioned spring 71 now causes the cam disc 70 to rotate further at high speed, until it abuts the stop 72 again. However, during this abrupt rotation of the cam disc, the cams 56 and 57 pass along the roller 54 and displace it, so that the lever 47 is held by the locking member 50. However, as a result, the drive of the control disc is also abruptly interrupted and the locking member 48 abruptly checks the control disc. Accurate switching is thus ensured.

The device for displacing the lever 47 is controlled by the operating members of the apparatus and by switching devices which determine the process of changing a magazine. The operating members are formed by an "on" switch 79 and an "off" switch 80 which, when operated, temporarily close a contact 81. Connected in parallel with contact 81 is the series combination of a contact 84 and a contact 82 which is closed by a cam 83 upon each complete revolution of the control disc at the end, after a magazine just played back is removed from the playback position. The contact 84 is automatically closed via a balance 100 by the "on" switch 79 and opened by the "off" switch 80. In series with this whole contact device, which is included in the circuit of the electromagnet 51, are a contact 85 which extends into the storage space 2 and ascertains whether a magazine is in the playback position, and a contact 86 which extends into the holder 30 and ascertains whether it is completely filled with magazines that have been played back. Lastly, a further circuit of the electromagnet 51 includes a contact 87 which projects by a feeler 88 through the aperture 8 of the storage space 2 into a magazine 89 to be played back and which senses the tension of a tape 90. This contact is actuated when a magazine has been completely played back, since the tension of the tape, as is well known, then increases. As a matter of fact, it is also possible to use another device for ascertaining whether a magazine has been played back.

If, in the rest position of the apparatus as described with reference to FIGS. 1 and 2, magazines are placed in the storage space, the switch 85 is closed. If, now, the "on" switch 79 is operated the electromagnet 51 is momentarily energized, the locking member 50 is swung away and the drive for the control disc 18 switched on. The playback device is thus brought into play connection with the magazine. The cam 56 switches off the drive for the control disc. The magazine is played back.

At the end of the playback process the contact 87 is closed and hence the electromagnet 51 energized again, so that the drive for the control disc is also switched on again. Consequently the magazine just played back is transported into the holder 30. At the end of this operation the cam 57 switches off the drive for the control disc and the cam 83 closes contact 82. If the storage space contains another magazine, then contact 85 is closed, that is to say the electromagnet 51 is energized again, so that the control disc brings the playback device into play connection with the new magazine.

These operations continue until either the storage space does not contain any more magazines, in which event contact 85 continuously interrupts the circuit of the electromagnet, or the holder 30 is completely filled and the circuit including contact 86 is likewise continuously interrupted so that the control disc can no longer be set into motion. The apparatus is then switched off.

If a playback process which is going on has to be interrupted, then the "off" switch 80 is actuated. As a result, contact 81 is closed and hence the electromagnet 51 energized, so that the magazine which is in the playback position at this time is moved into the holder 30 in the described manner by the control disc which has been set into motion. Since at the same time contact 84 is opened it is impossible for a further cycle to be initiated upon closure of contact 82 the circuit of the electromagnet remains interrupted.

If the apparatus is in the rest position and if the storage space contains a plurality of magazines of which only the magazine which is in the playback position has to be played back, it suffices to actuate only the switch 80 since this initiates a complete cycle which is eventually terminated by the opened switch 84.

As may appear from the foregoing, the apparatus can thus be used in a versatile manner, since continuous changing of magazines, as well as playback of individual magazines or interruption of a playback process at any arbitrary instant are possible.

Figure 6:
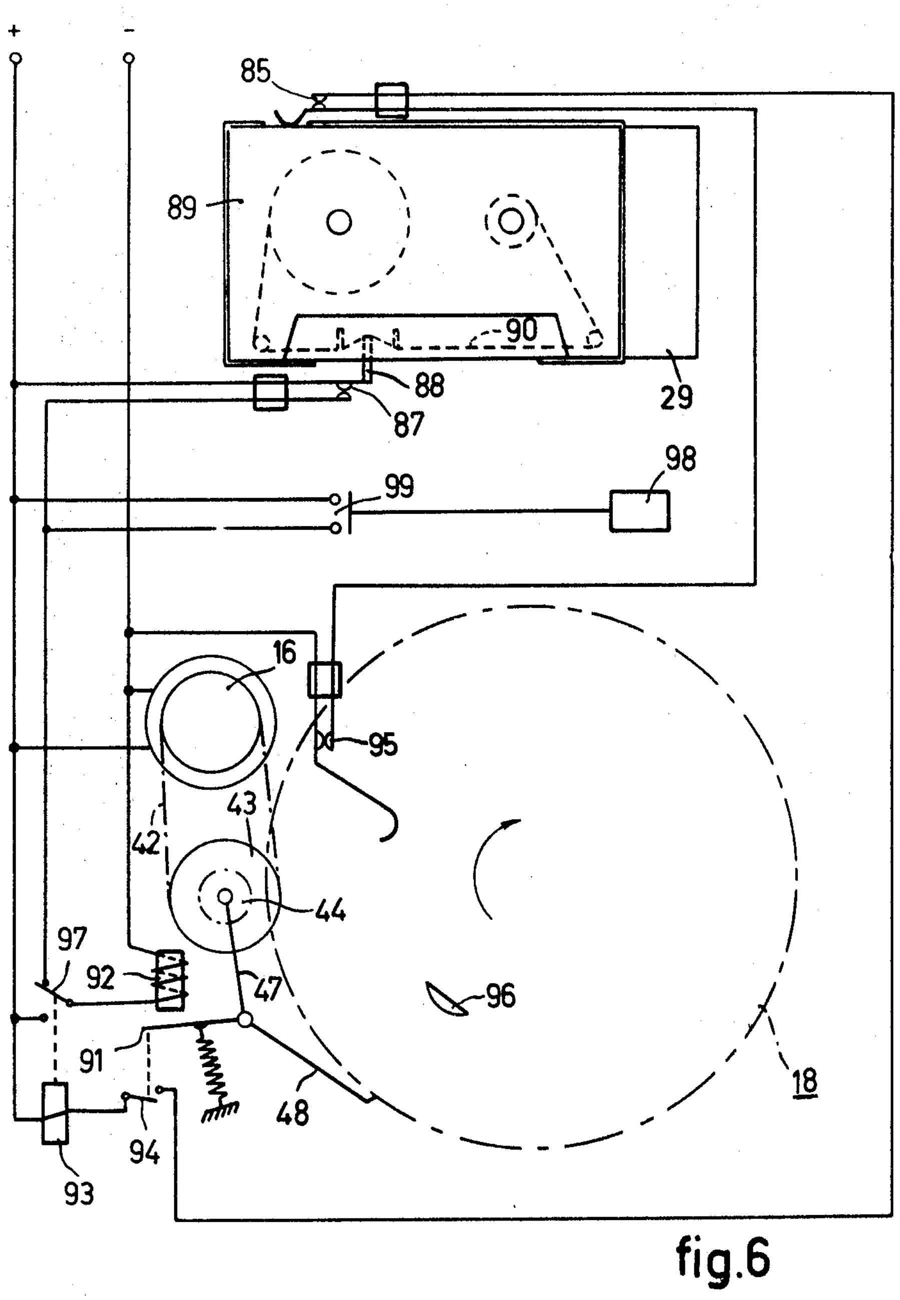
FIG. 6 shows another device for controlling this movement.

FIG. 6 shows a different control of the device for displacing the lever 47. In this example the lever 47 is directly operated by an armature 91 of an electromagnet 92, the gearwheel 44 driving the control disc when the magnet is energized. A self-holding relay 93 is provided for maintaining the electromagnet 92 energized for a predetermined period. The circuit of the self-holding relay 93 includes a contact 94 which is maintained closed by the armature of electromagnet 92 in the energized condition thereof, and connected in series with contact 94 are a contact 85, which ascertains whether a magazine is in the playback position, and a contact 95 which is transiently opened by a cam 96 on the control disc 18. The circuit of electromagnet 92 includes a switching contact 97 of the self-holding relay 93 and, in parallel combination, the contact 87 for sensing the tension of the tape and a contact 99 which is transiently actuated by an "on" switch 98 of the apparatus.

If the storage space contains two magazines and the playback process must be started, contact 99 is transiently closed by the "on" switch 98. The electromagnet 92 is energized and contact 94 is closed, so that the self-holding relay 93 responds and keeps the electromagnet energized by switching-over contact 97. The gearwheel 44 thus drives the control disc and the playback device is brought into play connection with the magazine to be played back. This being done, the cam 96 opens the contact 95 so that the self-holding relay is deenergized, and hence the electromagnet 92, resulting in interruption of the drive for the control disc.

When the magazine has been played back, contact 87 is closed and the electromagnet 92 switched on and maintained energized through the self-holding relay. The play connection between the playback device and the magazine just played back is interrupted through the control disc which is then driven and the said magazine is removed from the playback position. At this instant the cam 96 again occupies its original position shown in FIG. 6, relative to contact 95. Insofar a further magazine is in the playback position, the self-holding relay is energized further via the contact 85 so that a new cycle is initiated. If the storage space contains no more magazines, the contact 85 is opened so that the drive for the control disc is switched off and the apparatus comes to a standstill. As a matter of fact, the apparatus can also be switched off by a separate switch, not shown, during playing back a magazine.

Figure 7:
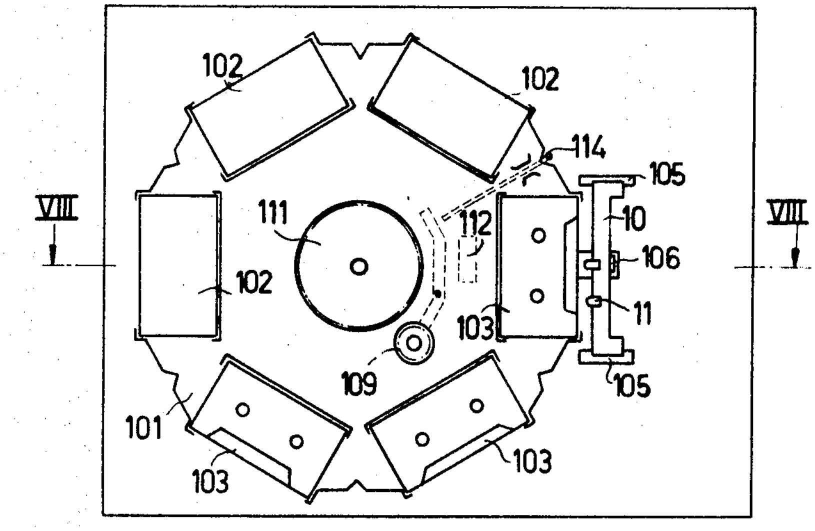
FIG. 7 is a plan view and FIG. 8 is a sectional view, taken on the line VIII–VIII of FIG. 7, of a second embodiment having a disc-shaped storage device for magazines.
Figure 8:
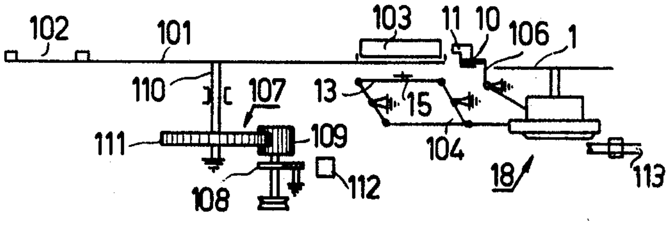

In the embodiment of FIGS. 7 and 8 the storage device for the magazines to be played back is formed by a disc 101 having six recesses 102 distributed over its periphery, in which magazines 103 can be accommodated. Beneath the disc 101 is a frame 13 which carries the winding mandrels 15, the drive of which is not shown. The frame can be moved up and down by means of a parallelogram guide 104, so that either the winding mandrels can be brought into operative connection with the winding cores of the magazine which is in the playback position, or this operative connection can be eliminated. This movement is controlled by the control disc 18. The chassis 1 is further provided with a support 10 which carries the scanning members 11 and can be displaced in a slide guide 105 towards the disc 101 and away therefrom. The displacement of the support is derived from the control disc 18 through a lever 106.

The transport mechanism for removing a magazine from the playback position is formed by a driving device 107 which can be coupled to the control disc 101 and causes a 60° rotation of the disc 101 for changing a magazine, so that such a magazine leaves the playback position in a direction at right angles to the winding mandrels. For this purpose a gearwheel 109 seated on a pivot lever 108 is used, which gearwheel is continuously driven by the driving motor of the apparatus in a manner not shown and can be coupled to a gearwheel 111 seated on a shaft 110 of the disc 101. The lever is pivoted by means of an electromagnet 112 the circuit of which is switched by a contact 113 operated by the control disc 18. The lever 108 further displaces a locking member 114 which locks the disc in the position in which a magazine is played back.

Figure 5:
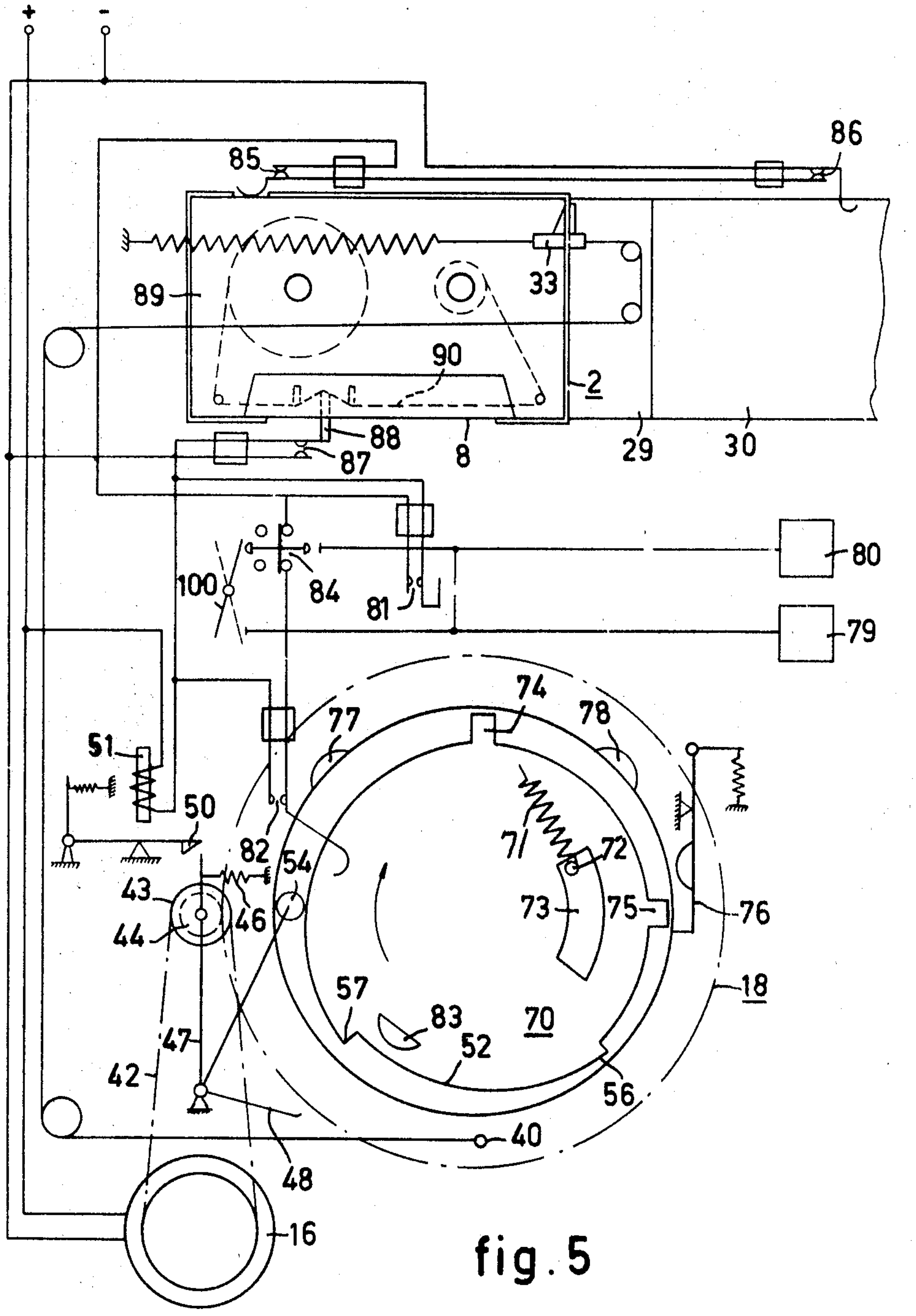
FIG. 5 shows for the above-mentioned embodiment, the device for controlling the movement in changing a magazine.

The control disc for controlling the movement of the magazine changing will be driven in a similar manner as has been described, with reference to the embodiments of FIGS. 5 and 6.

The apparatus operates in such manner that for the magazine changing controlled by the control disc 18, the support 10 is moved away from the magazine 103 which is in the playback position, the frame 13 with its winding mandrels 15 is lowered, and then the transport mechanism 107 for the disc 101 is set into motion, until the next magazine has reached the playback position. Subsequently the frame is lifted and the support moved towards the magazine, whereby the playback process begins.

As a matter of fact, numerous variations of the above-mentioned embodiments are possible without passing beyond the scope of the invention. Thus the drive of the control disc may take place in a great variety of manners, for example the control disc can bring about a plurality of changing cycles during one revolution. Also, the frame can be brought in the most divergent manners from the position in which the winding mandrels are in operative connection with the winding cores into the position in which this operative condition is eliminated. Furthermore the path along which a magazine which has been played back is removed from the playback position can be chosen in the most divergent directions at right angles to the winding mandrels. In the case of a chutelike storage space for the magazines it is also possible to provide a mechanism which moves a played magazine back into the storage space.

What I claim is:

1. An apparatus for playing back and changing a plurality of tape recorder magazines, each magazine having two winding cores and at least one aperture across which a tape extends from one winding core to the other so as to be exposed by said aperture for playback, said apparatus comprising a chassis, a storage means mounted on said chassis for holding the plurality of magazines in position ready for playback, one of said magazines which occupy said storage means being in an operative position so that its tape is available for playback, a playback mechanism for engaging the magazine in the playback position so as to effect playback of its tape, said mechanism comprising a support member mounted on said chassis for pivotal movement toward and away from said aperture and exposed tape, a tape-scanning member carried on said support and located thereon so that when said support is moved toward the magazine the scanning member will be inserted into the aperture of said magazine across which said tape extends so as to engage said tape for playback, a frame member pivotally mounted on said chassis for movement between a first position and a second position, a pair of winding mandrels attached to said frame member so as to be in cooperative engagement with said winding cores of the magazine in the playback position when said frame is in the first position and out of engagement with the winding cores when said frame is in the second position and an electric motor having its output connected with at least one of said mandrels for driving the same, a transport mechanism for removing a magazine from the playback position in a plane substantially perpendicular to the longitudinal axis of the winding mandrels and in a direction perpendicular to the direction of insertion of said scanning member, said transport mechanism being actuated for removing said magazine when said frame member has been moved to its second position, a control disc rotatably mounted on said chassis, a first operating means mounted on said control disc and connected with said frame member for moving said frame member between said second and first positions as said control disc is rotated, a second operating means mounted on said control disc and connected with said support member so as to cause said scanning member carried on said support member to be moved toward and away from said magazine as said control disc is rotated, means connected to said control disc for actuating said transport mechanism to remove the magazine from the playback position as said control disc is rotated and means driven by said electric motor for rotating said control disc a predetermined amount for causing said playback mechanism to move into engagement with said magazine and for rotating said disc another predetermined amount upon the completion of the playback operation whereby said scanning member will be moved out of engagement with said tape, said frame member will be moved to its second position so that the mandrels are out of engagement with the winding cores and said transport mechanism will operate to remove the magazine from the playback position so that the next magazine held in the storage means if any will move into the playback position.

2. The apparatus according to claim 1 wherein said first operating means comprises a first cam track and a cam follower attached to said frame member for cooperating with said first cam track, and wherein said second operating means comprises a second cam track and cam follower means attached to said support member for cooperating with said second cam track.

3. The apparatus according to claim 2 wherein said storage means comprises a chutelike space having a base, front and rear walls and two sidewalls for stacking loosely therein magazines placed one on top of the other, the lowermost magazine resting on the base and being in the operative position for playback, a slotted opening in one of said sidewalls through which the lowermost magazine is removed by said transport mechanism, a guide channel located in said base and extending transversely from one sidewall to the other and slightly therebeyond for guiding therein said transport mechanism, a pair of apertures in said base for receiving therethrough said mandrels and an aperture located in said front wall being aligned with the aperture in the lowermost magazine for receiving therethrough said scanning member.

4. The apparatus according to claim 3 wherein said transport mechanism comprises a slide member guided in said channel, a gripping member pivotally mounted on said slide being biased in an upright position with respect to the base of said chutelike storage space, said gripping member being tiltable only in the direction of movement of removing said magazine so that when a magazine is in the playback position said gripping member will be tilted down and substantially flush with said base, and wherein said means connected to said disc for actuating said transport mechanism comprises a first rope connected at one end thereof to a pin mounted near the periphery of said control disc and at its other end thereof to one side of said slide, whereby rotation of said control disc will cause said slide to travel so that said gripping member will be free of the lowermost magazine thereby becoming erect and will then be caused to travel in said guide channel in a direction toward said slotted opening, said gripping member thereby engaging an edge of said magazine for removal of said magazine from the playback position, removal of said magazine and replacement thereof by the next magazine in said storage means being accomplished by one complete revolution of said control disc.

5. The apparatus according to claim 4 wherein said means for biasing said gripping member in an upright position comprises a helical spring.

6. The apparatus according to claim 4 further comprising a second rope connected at one end thereof to the other side of said slide and at its other end to a spring attached to said chassis for urging said slide toward the sidewall of said storage means without the slotted opening.

7. The apparatus according to claim 3 further comprising a holder mounted on said chassis and located adjacent to said storage space for receiving magazines removed from the playback position by said transport mechanism.

8. The apparatus according to claim 7 wherein said holder is capable of storing a number of magazines equal to the number stored in said storage means.

9. The apparatus according to claim 8 further comprising means for detecting when said holder is full and operating to deactivate the playback mechanism.

10. The apparatus according to claim 9 wherein said detecting means comprises a normally closed limit switch having a feeler extended into said holder whereby said feeler will be displaced when said holder is full so as to open said switch and stop playback operation.

11. The apparatus according to claim 2 wherein said means for rotating said control disc comprises a lever pivotally mounted at a pivot point on said chassis, a gearwheel rotatably carried on said lever, drive means connected to said gearwheel for continuously driving same by said electric motor, peripheral gearing located on the periphery of said control disc, biasing means attached to said lever for urging said gearwheel into meshing engagement with said peripheral gearing to thereby cause rotation of said control disc, displacement means for moving said gearwheel out of engagement with said peripheral gearing and a locking arm attached to said lever for engagement with said peripheral gearing so as to prevent rotation of said control disc when said displacement means has moved said gearwheel out of engagement with said peripheral gearing.

12. The apparatus according to claim 11 further comprising a releasable locking mechanism arranged for engaging said lever so as to retain said lever in a position such that said gearwheel is maintained out of engagement with said peripheral gearing and means for releasing said locking mechanism to allow said gearwheel to engage said peripheral gearing for causing rotation of said control disc when a new magazine is in position for playback so as to initiate the playback operation by moving the playback mechanism into engagement with said magazine and when playback operation is to be terminated so as to initiate removal of said magazine by actuation of said transport mechanism.

13. The apparatus according to claim 12 wherein said displacement means comprises a cam disc having a third cam track with cam surfaces thereon, said cam disc being rotatably mounted on said control disc, cam follower means attached to said lever for cooperating with said third cam track and for moving said lever about its pivot point so that said gearwheel will be moved away from said peripheral gearing after said playback mechanism has been moved into engagement with said magazine and after said transport mechanism has moved a magazine from the playback position.

14. The apparatus according to claim 13 further comprising arresting means for preventing rotation of said cam disc during rotation of said control disc, means for releasing said cam disc when said control disc has reached the proper position and spring means attached at one end thereof to said cam disc and at the other end thereof to said control disc, said spring means being tensioned while said cam disc is prevented from rotating and whereby said cam disc is caused to rotate rapidly under the influence of said spring means so that said lever is abruptly displaced thereby abruptly stopping the rotation of said control disc and providing rapid and accurate operations of said playback and transport mechanisms.

15. The apparatus according to claim 14 wherein said arresting means comprises a plurality of holding lugs attached to the periphery of said cam disc there being an equal number of holding lugs as there are cam surfaces on said third cam track, and a locking lever pivotally mounted for engaging one of said holding lugs to thereby prevent rotation of said cam disc and wherein said means for releasing said cam disc comprises a releasing cam for each of said holding lugs, said releasing cams mounted on said cam disc for engaging said locking lever so as to release it from engagement with said holding lug thereby allowing said cam disc to rotate under the influence of said spring.

16. The apparatus according to claim 15 further comprising an abutment on said control disc to which said spring for causing rotation of said cam disc is attached, and a slot in said cam disc through which said abutment extends so that rotation of said cam disc is abruptly stopped when said abutment engages an end of said slot.

17. The apparatus according to claim 16 wherein said cam track on said cam disc comprises two cam surfaces, one of said cam surfaces being engaged by said cam follower means attached to said lever so as to disengage said gearwheel from said peripheral gearing after said transport mechanism has removed a magazine from the playback position, the other cam surface being engaged by said cam follower means attached to said lever so as to disengage said gearwheel from said peripheral gearing after the playback mechanisms have been moved into engagement with said magazine.

18. The apparatus according to claim 12 wherein said releasable locking mechanism comprises a pivotally mounted locking arm a pin mounted on said lever, a hook-shaped member at one end of said locking arm for engaging said pin, means attached to said locking arm for biasing said locking arm in a direction so as to prevent disengagement of said pin from said hook-shaped member, an electromagnet for causing said locking arm to pivot in a direction allowing disengagement of said pin from said hook-shaped member when said electromagnet is energized thereby releasing said lever and allowing said gearwheel to engage the peripheral gearing on said control disc and means for energizing said electromagnet when a magazine is in the playback position and said playback mechanism is to be moved into engagement therewith and when said playback mechanisms are to be disengaged from said magazine and actuation of said transport mechanism is to be initiated.

19. The apparatus according to claim 18 wherein said means for energizing said electromagnet comprises in series therewith a source of electric power, an "on" switch which is closed when the apparatus is turned on, a switch having feeler means penetrating said storage space so that it is closed when a magazine is in the playback position, a normally closed switch having a feeler penetrating a holder for storing ejected magazines so that it is opened when said holder is full, said electromagnet also being in series connection with a switch which is closed when the tape in the magazine is completely played, whereby said electromagnet will be energized to start the playback operation when said holder is not full, a magazine is in the playback position and when the "on" switch is closed, said electromagnet also being energized to disengage the playback mechanism from said magazine and initiate operation of said transport mechanism when the tape of a magazine is completely played.

20. The apparatus according to claim 19 further comprising a switch in series with said electromagnet which is closed by operating means on said control disc after a complete change of magazines in the playback position and an "off" switch in series therewith.

21. The apparatus according to claim 18 wherein said means for energizing said electromagnet comprises a source of electric power, an "on" switch for starting the rotational movement of the control disc, a switch which is operated if the tape of a magazine is completely played back, and a contact of a holding relay for the electromagnet, and a switch for stopping the movement of the control disc in series with the holding relay and controlled by a feeler sensing the presence of a magazine in the playback position, and another switch which is operated for a short period by the control disc.

22. The apparatus according to claim 2 wherein said frame member comprises a mounting plate which is pivotally attached to said chassis by a shaft the longitudinal axis of which is perpendicular to the longitudinal axis of the shaft of said electric motor and is located a small distance therefrom, said electric motor being mounted on said mounting plate.

23. The apparatus according to claim 3 further comprising an aperture in said rear wall, a thrust lever pivotally mounted on said chassis having a free end aligned with said rear wall aperture, a fourth cam track mounted on said control disc, cam follower means attached to said thrust lever for pivoting said thrust lever as said control disc is rotated, whereby said free end will be inserted into said rear wall aperture to engage a magazine in the playback position so as to move said magazine into a proper defined position for engagement with said playback mechanism.

24. The apparatus according to claim 4 further comprising a locking member located in the path for removing a magazine from the playback position to prevent inadvertent removal of a magazine from the playback position, means connected to said locking member for removing the locking member from the removal path only during operation of the transport mechanism for removing a magazine from the playback position.

25. The apparatus according to claim 24 wherein said means for removing said locking member comprises a fifth cam track mounted on said control disc, and a cam follower linked to said locking member.

26. The apparatus according to claim 25 further comprising a counter which can be reset to zero, said counter being automatically reset by means mounted on said control disc upon the changing of each magazine.

27. The apparatus according to claim 27 further comprising an additional aperture in said base, a drive shaft mounted on said frame extending through said additional aperture for cooperative engagement with the tape when said frame member is moved into said first position.

PO-1050
(5/69)

UNITED STATES PATENT OFFICE
CERTIFICATE OF CORRECTION

Patent No. 3,589,733 Dated June 29, 1971

Inventor(s) TADEUS PIOTROWSKI

It is certified that error appears in the above-identified patent and that said Letters Patent are hereby corrected as shown below:

In the Title - after "Vienna" delete "Australia" and insert --Austria--

- after "June 16, 1967" delete "Australia" and insert --Austria--

Signed and Sealed this 30th day of May 1972

(SEAL)
Attest:

EDWARD M.FLETCHER,JR.
Attesting Officer

ROBERT GOTTSCHALK
Commissioner of Patents